United States Patent Office 3,442,704
Patented May 6, 1969

3,442,704
PROCESS FOR REMOVING STARCH FROM SORGHUM JUICES
Burns A. Smith, Weslaco, Tex., assignor to the United States of America as represented by the Secretary of Agriculture
No Drawing. Filed Nov. 4, 1966, Ser. No. 592,685
Int. Cl. C13d 3/00; B01d 21/01
U.S. Cl. 127—50                    1 Claim A non-exclusive, irrevocable, royalty-free license in the invention herein described, throughout the world for all purposes of the United States Government, with the power to grant sublicenses for such purposes, is hereby granted to the Government of the United States of America.

This invention relates to a process for removing starch from sorghum juices. More particularly, this invention relates to a process which insures the essentially complete elimination of starch from the juices of sweet sorghums to the end that sugar may be crystallized from the juices that have been freed from starch via the process disclosed and claimed herein.

Periodic unsuccessful efforts have been made in this country since about 1880 aimed at the commercial production of sucrose from the juices of sweet sorghums. The primary difficulty involved has been the presence of starch in the extracted juices from the sorghum. The starch in the stalks of the sorghum is extracted along with the sugars. The quantity of starch extracted typically varies from about 0.4% to 3.0% of the juice solids, the higher levels being characteristic of the sorghum varieties that provide the juices of highest sucrose content. These latter varieties are, of course, the varieties of most interest from the point of view of sugar production.

Starch is an objectionable impurity in juices intended for sugar production for the reason that conventional processing procedures (i.e., purification and sterilization) require the heating of the juices to approximately 90° C. and at such temperatures starch is gelatinized. The gelatinization of even small amounts of starch will increase the viscosity of the sugar containing syrup to a degree that sucrose crystallization is invariably sharply reduced and often is rendered impossible. Despite the known gelatinizing effect on starch of heating and liming, the prior art attempts to produce sugar from sweet sorghum juices employed the liming of the juice to neutrality or even beyond neutrality to alkalinity, and also employed a heat treatment of the juice at temperatures close to the boiling point, after the fashion that is customary for sugarcane juice processing. These unreasonable operations (unreasonable in the case of sorghum juice processing for sugar) provide at least part of the explanation for the unsuccessful attempts to process sorghum juices for sucrose.

Another problem encountered in prior efforts to process sorghum juice for sugar arose from the attempted use of high-density juices (16–20° Brix solids content). These high-density juices were the result of crushing the sorghum stalks using a single pass through the mill rolls. Multiple passes through the mill rolls, with water added at each pass, was considered an unacceptable practice by the sugar processing industry until about the turn of the centry even though it was recognized that multiple passes through the crushing rolls raised the overall extraction of sucrose from about 70% to about 90%. By this time, serious attempts to process sweet sorghum juices commercially for sugar were no longer being made.

Some efforts were again made to process sweet sorghum juices for sugar in the early 1940's, but once more high-density juices were employed, since it was considered too expensive to concentrate the dilute juices which result from multiple pass crushing operations.

It was proposed, in the early 1940's (see U.S. Patent No. 2,280,085) to remove starch from sweet sorghum juices by the introduction of a centrifugation step just prior to clarification and indeed this mode of operation resulted in the removal of some 70% of starch in the sorghum juice. Conventional liming and heating of the juice as employed in the commercial sugarcane operation could then be relied upon to remove some of the residual starch up to about 93%, provided open-top settling tanks were used, which tanks would allow the removal by skimming of the floating scums that contained starch. The aforementioned patent proposed to centrifuge, clarify by liming and heating, and in addition to make use of a suitable starch-converting enzyme for removal of the last vestiges of stach. The principal objections to such an involved procedure are the excessive time requirements and the expense involved. Sugar processors no longer use batch-type settling tanks for juice clarification and present continuous clarification operations contain no provision for skimming operations. Moreover, the use of enzymes demand sanitary measures quite beyond the average processor's operating capabilities. The requisite juice holding times of an hour or more at temperatures which are ideal for the growth and the propagation of sugar-destroying organisms are unattractive from a commercial point of view.

A carbonation procedure similar to that employed in the sugar beet industry might be expected to eliminate starch from sweet sorghum juices with good efficiency, but unfortuniately, the temperatures required to obtain adequate calcium carbonate crystal growth are sufficiently high to effect gelatinization of the starch in the sorghum juice. Elevated temperatures and the excess of lime present, together with the large amounts of the invert sugar normally present in the sweet sorghum juices tends to cause excessive color formation. Thus, of course, is not a problem in the beet sugar industry.

The liming and the heating required for clarification and settling of sugarcane juices will cause starch gelatinization in the case of sweet sorghum juice. If lower temperatures are resorted to, then inadequate clarification will result and the settling of the juice sediments will require several hours during which interval the sweet sorghum juices are susceptible to fermentation and to dextran formation.

It is the purpose of this invention, therefore, to provide a process for removing, essentially completely, the starch from sweet sorghum juices to the end that the starch-free juices can be processed for sucrose. This process for starch removal has been designed keeping in mind that raw, sweet sorghum juices of low density must be used in the interest of high extraction efficiencies, and that operating conditions must be such that the sugar present in the extracted juices will not be adversely affected either with respect to quality or to quantity.

In general, the process of the invention herein disclosed and claimed, which process for the first time permits of the commercial processing of sweet sorghum juice for sugar, contemplates the utilization of sweet sorghum juices of density not exceeding 16° Brix. These juices are limed to a pH not exceeding 9.0, treated with a flocculant, maintained throughout the process at a temperature which in no case is allowed to exceed 60° C., and permitted to clarify by settling.

More specifically, we can carry out our process using juice densities over the range of 12–16° Brix, which juices have been limed to a pH over the range 7.0 to 9.0, maintained throughout the process at temperatures within the range 15° C. to 70° C., and treated during the processing with an effective amount of a flocculating agent. Still more specifically, we prefer to carry out our processing using sweet sorghum juice densities in the range 13–15° Brix, pH values of the juice in the range 7.5 to 9.5, processing temperatures not exceeding 60° C., and a flocculating agent in the amount of from 3–5 parts per million based on the weight of the juice.

As mentioned earlier, it is desirable, as is the current practice in the sugarcane and sugarbeet industry, to obtain high levels of sugar extraction from the plant and work with lower density juices. Sucrose extraction levels of 90% usually provide raw juices at about from 12–15° Brix. Lower juice densities favor more rapid sedimentation of suspended material such as starch. In clarifying 12–15° Brix raw juices at neutrality or at pH 8.3 and higher, the sedimentation in the case of sweet sorghum juices has been observed to take place in from 1–3 hours. The upper layers, while not entirely clear, are relatively free of starch particles. Sedimentation and compaction of the sedimentary layers is improved under these conditions of Brix and pH, particularly when the juices are heated to about 60° C. before settling. Using the aforementioned conditions of juice density, temperature, and pH, and with the addition of a flocculating agent, starch elimination is entirely dependable and occurs in less than 1 hour. The product juices are of greatly improved clarity, some providing clarities of 70% in the Luximeter which instrument is employed for testing sugarcane juice clarities. Sugarcane juice clarities rarely exceed 50% in the Luximeter by way of contrast. In selecting the optimum pH for the raw juice prior to heating and prior to the addition of the flocculating agent, factors such as ash content and juice color must be considered. It is true that adjusting the pH of the juice to 8.0 or more will improve the clarity of the ultimate juice, but this pH will result in an increased extraction of undesirable red and brown colors. Color apparently arises from finely divided plant material present in the juice. The colors formed are quite refractory to active carbon and to $SO_2$ treatments. Moreover, when liming is continued to the pH of 8.0 or above, soluble lime salts are formed and these salts serve to effectively reduce the juice purity by increasing the mineral content. This situation makes less sugar available for crystallization.

A drop in the pH of the juice occurs when the insoluble materials settle out. Tests show that pH adjustment to 7.7 on the raw juice will yield a clarified juice of pH 7.0 to 7.2. Following concentration of this juice to a syrup, the pH will again drop, this time to about pH 6.8 to 6.9, which is considered ideal for the crystallization of insoluble aconitates from the heated syrup. At a clarification pH of 7.5 to 7.7, there is a minimum of objectionable color formation consistent with the efficient removal of starch and other suspended and colloidal material and there is a minimum increase in the amount of mineral constituents. Purity rise during clarification generally ranges from 1.8 to 4.0. Starch elimination exceeds 97%, which percentage value, under the worst conditions, leaves the final juice with 0.04% of starch based on the juice solids and under the best conditions leaves the final juice with about 0.01% of starch based on the juice solids.

The following examples will set forth in more detail the process of the invention.

EXAMPLE 1

Raw juice in the amount of 16.5 l. was obtained by crushing sweet sorghum stalks. The raw juice measured 17.8° Brix. Juice in the amount of 20.25 l., measuring 14.8° Brix, was obtained by dilution with water. A portion (19.5 l.) of the diluted raw juice was placed in a steel tank (3 feet deep and 10 inches in diameter) provided with an agitator. The temperature of the juice at this time was 22° C. and the pH measured 5.5. A lime solution ($Ca(OH)_2$-aqueous) was slowly added to the raw diluted juice with constant agitation until a pH of 7.7 was obtained. At this point, and with continued agitation, 195 ml. of a 0.05% by weight aqueous solution of a flocculating agent (a high molecular weight polymer of acrylamide) was added. After addition of the flocculating agent, the agitation was stopped and coagulation of the lime-induced fine floc into large clumps (⅛ inch and more in diameter) was instantaneous. The thus treated juice was allowed to settle one hour and the clear upper layer siphoned off and analyzed. The settled material which comprised about 30% by volume of the total juice at this time was freed of the bulk of its juice content and also analyzed.

The analytical data for the juice and settled material are set forth in Table I.

TABLE I

|  | Dry solids | Purity | Starch based on percent of solids | Clarity (percent transmission in Luximeter |
| --- | --- | --- | --- | --- |
| Raw juice | 14.74 | 78.7 | .69 | |
| Clarified juice | 14.00 | 80.7 | .01 | 68 |
| Sediment | 21.16 | 40.6 | 10.07 | |

The clarified juice was of a quality suitable for the production of raw sugar since it had been freed of starch and other impurities. At the same time, juice purity was improved.

The following several groups of examples, the data for which in several cases is presented in tabular form, typify the careful effort that went into the design of the process. They will serve also to display the extreme criticality of certain features of the process.

EFFECT OF pH ON COLOR OF THE CLARIFIED JUICE

| pH | Alkali employed for pH adjustment | Temperature (° C.) | Juice density, degrees Brix | Additive |
| --- | --- | --- | --- | --- |
| 7 | $Ca(OH)_2$ | 18–20 | 13.8 | None. |
| 8 | $Ca(OH)_2$ | 18–20 | 15.6 | Do. |
| 9 | $Ca(OH)_2$ | 18–20 | 15.6 | Do. |

All samples were settled 2–5 hours (until upper layers were relatively clear). All samples analyzed less than 0.02% starch based on the juice solids. The color of the clarified juices was increasingly dark as the pH increased. Color formed at pH 9.0 was definitely objectionable.

Effect of alkali (type) used for adjustment of juice pH

Several samples of sorghum juice were diluted to 14.9° Brix density and the adjustment of pH to 7.7 was made with (1) $Ca(OH)_2$, (2) $Mg(OH)_2$, (3) equal parts by weight of $Ca(OH)_2$ and $Mg(OH)_2$, and (4) a mixture of equivalent weights of $Ca(OH)_2$ and $Mg(OH)_2$. All four samples were treated with 5 p.p.m. of a flocculating additive and settled for one hour. All four samples exhibited rapid flocculation and settling and yielded juices of satisfactory clarity. Starch contents of the cleared upper layers of juice were (1) .003%, (2) .03%, (3) .02%, and (4) .01% on the juice solids basis.

Potassium hydroxide and sodium hydroxide are both operable for adjustment of the juice pH but sodium hydroxide in particular seems to give rise to objectionable color in the cleared juice layers and it is therefore not a preferred reagent for adjusting the pH of the juice.

The process which is the subject of this invention is relatively insensitive to temperature below about 60° C. Juices have been clarified at the temperatures that typically obtain in the laboratory with no effort being made to control temperature precisely. Accordingly, temperatures as low as 20° C. and as high as 40° C. have been encountered with no adverse effect on the process. However, above 60° C. starch included in the sorghum juices starts to gelatinize as note the following experiment.

Two samples of sorghum juice, one of 16.6° Brix density, the other of 14° Brix density, were adjusted to pH 7.7 with lime. Treated with a flocculating additive and allowed to settle. Both juices settled rapidly and provided clear juice upper layer with no detectable starch. A second sample of the 14° Brix juice was given the same treatment except that it was heated to 70°–75° C. The settled and clarified juice layer in this case contained 10% of the original starch.

Operable types of flocculating additives

A large number of commercially available flocculating agents were examined for their ability to clarify sorghum juices and concurrently remove starch. Adjustment of the juice pH to about 7.0 to 9.0 usually provides a finely divided floc that will settle in time and carry down with it a goodly percentage of color and suspended matter but in no case, without additive, was the finely divided floc capable of trapping and carrying down as sediment essentially all of the extraneous juice materials (i.e., starch) in a reasonable length of time (e.g., one hour or less) which rate of settling is almost mandatory if juice spoilage is to be avoided.

One flocculating additive that is eminently satisfactory for the process is of the type referred to commercially as the "anionic." This particular material is described as a high molecular weight polymer of acrylamide containing approximately 30% of carboxylic acid groups and 70% of amide groups. The molecular weight of the polymer is said to be someplace between 2 and 3 million and the reaction of the material is anionic in neutral and in alkaline solution.

A second suitable flocculating additive is of the type referred to as an anionic polyelectrolyte. Yet another additive that has been established as operable in this process is the "citrus pectate pulp" which material is described by its producers as a high molecular weight pectate-cellulose mixture. As for the type of flocculating additive to be employed in the process, the requirements appear to be indifferent. It is theorized that the anionic type produces clump formation (flocculation) via a dissipation of the electrical charge on the fine floc particles with accompanying coprecipitation of the starch and other suspended matter in the juice. The action of the pectate type would almost certainly be different and may involve the formation of insoluble calcium pectate, magnesium pectate or iron pectate which precipitates physically enrobe the starch and other suspended matter.

Whatever the specific mechanism involved, the types listed are operable with good and about equal efficiency.

Having thus described the process of the invention, I claim:

1. The process for removing starch granules from raw sorghum juice which process consists in its entirety of the following steps all carried out at a temperature not exceeding 60° C.: (1) adjusting the juice density, within the range 12°–15° Brix; (2) adjusting the juice to a pH of about from 7.5–7.7 with a member selected from the group consisting of magnesium hydroxide, calcium hydroxide and mixtures thereof to produce a floc in the juice; (3) incorporating into the juice a flocculating additive in the amount of from 3 to 5 parts per million; and (4) separating the floc from the clarified juice to produce a sorghum juice substantially free from starch granules.

References Cited

UNITED STATES PATENTS

| | | | |
|---|---|---|---|
| 2,059,971 | 11/1936 | Scott | 127—48 |
| 2,280,085 | 4/1942 | Ventre et al. | 127—48 X |
| 2,913,359 | 11/1959 | Pollock et al. | 127—71 |
| 2,937,143 | 5/1960 | Goren | 127—50 X |

MORRIS O. WOLK, *Primary Examiner.*

D. G. CONLIN, *Assistant Examiner.*

U.S. Cl. X.R.

127—40, 55, 71